3,322,555
WATER-INSOLUBLE PROTECTIVE COATINGS FOR PHOTOGRAPHIC MATERIALS
Wolfgang Himmelmann and Walter Krauss, Cologne-Stammheim, and Alexander Riebel, Leverkusen, Germany, assignors to Agfa Aktiengesellschaft, Leverkusen, Germany, a corporation of Germany
No Drawing. Filed Apr. 9, 1963, Ser. No. 271,567
Claims priority, application Germany, May 2, 1962,
A 40,115
4 Claims. (Cl. 117—33.3)

The invention relates to photographic materials having protective coatings applied externally on one or both sides.

It is known to provide the emulsion side and the rear side of photographic, gelatine-containing materials with protective coatings for protection against scratching and other damage. These coatings are either applied at the time of manufacturing the light-sensitive material or, particularly with cine film and photographic papers, after the processing thereof. Materials of very different chemical constitution are used for these coatings. Depending on the nature of the coating material, aqueous solutions, organic solutions as well as aqueous dispersions may be used. Water-soluble or alkali-soluble coating materials include, for example, albumins, partially or completely hydrolysed polyvinyl acetate, polyvinyl phthalate and cellulose acetate phthalate. The following products have been proposed as film-forming resins which are insoluble in water but soluble in organic solvents: natural resins such as damar resins, sandarac, Manila copal, colophony or synthetic film-forming polymers such as cellulose ester, polyvinyl acetate, polyvinyl chloride, polystyrene, cellulose ether, formaldehyde condensation resins such as phenol-formaldehyde resins, and other resins.

Water-soluble protective coatings are disadvantageous, since they are sensitive to humidity and in addition the materials provided with such coatings stick together in a humid atmosphere. The coatings are also sensitive to moist fingers. The long drying periods when applying from aqueous solution are usually undesirable.

Of the water-insoluble resins, nitrocellulose lacquers and various natural resins inter alia have the disadvantage that they show yellowing to a greater or lesser degree under the action of heat or light, and this is particularly undesirable in connection with photographic colour pictures. Polystyrene, polyvinyl acetate, cellulose acetate and similar raw materials have an unsatisfactory bonding with layers containing gelatine, so that after the coating has dried completely, it is easily detached when the layers are touched or under mechanical stress. It is true that the detachment can be substantially prevented by providing suitable intermediate layers, but this necessitates an additional working step. Finally, additives such as dyestuffs, ultra-violet absorption agents and matting agents cannat be introduced in sufficient quantity into all raw materials of lacquers without deleteriously modifying the bonding or the layer elasticity.

We now have found that ternary copolymers which are composed of 80–92% of vinylchloride, 3–19.5% of vinyl acetate and 0.5–5% of (I) an unsaturated aliphatic dicarboxylic acid or anhydride such as maleic acid or maleic anhydride or (II) vinyl alcohol units, are excellently suitable as binding agents for protective layers.

These polymerisation products are completely insoluble in water, but have good solubility in solvents which are satisfactory for photographic purposes, such as esters, ketones or mixtures thereof. In addition, these lacquer mixtures have an excellent compatibility with other solvents, such as aromatic hydrocarbons and halogenated hydrocarbons, e.g., Freons, which are frequently used as propellants in spray containers. By selecting a suitable proportion between solvents of high and low boiling points, it is possible to produce lacquer solutions which can easily be applied by means of spray guns, spray containers or by dipping or brush lacquering. Finally, other substances such as matting agents and UV-absorbing agents can be incorporated in quantities up to 50%, based on the quantity of material, into the lacquer without impairing the bonding to the support.

The materials have a good compatibility with various phthalic acid esters which are frequently employed as plasticisers, so that these can be incorporated into the film without any deleterious effect on the mechanical properties. Suitable are, for example, dioctyl phthalate, dibutyl phthalate and the like.

The copolymers according to the invention adhere very well both to the support of the photographic material and to the hydrophilic gelatine-containing layer. Furthermore, they do not adversely effect the light-sensitive layer or the layer carrying the photographic image. The protective coatings according to the invention are extremely insensitive to light and humidity and do not show any yellowing, even on exposure to intense light. With multi-layer colour papers, the dyestuffs of the uppermost layer are not damaged or destroyed. The stability in storage of colour photographic images under extreme conditions such as 40° C. and 80–90% relative atmospheric moisture is substantially improved by the protective layers according to the invention. The colour tone of a silver image is not changed. Since the protective lacquer also adheres to hydrophobic and hydrophilic layer supports, such as cellite or paper, it can be applied to both sides by dipping. In this case also, other substances such as filter dyestuffs can be added in quantities up to 50%, based on the quantity of lacquer substance. The lacquer has excellent protective colloid properties. Thus, ester-soluble UV-absorbers which have been added to the lacquer do not crystallise even after drying the protective coatings. These coatings show no yellowing. The protective layers, according to the invention, should have a thickness of 5–30 $\mu$, preferably 10–20 $\mu$.

*Example 1*

The following compounds are dissolved in a solvent mixture consisting of 80 ml. of amyl acetate and 116 ml. of methyl acetate:

13 g. of a copolymer containing 86% of vinyl chloride,
13% of vinyl acetate,
1% of maleic acid, and
1.1 ml. of phthalic acid dibutyl ester.

The polymer has a viscosity factor $Z_n$ (according to Staudinger) of 0.53, in cyclohexanone at 20° C. The lacquer solution thus obtained is so applied to the layer side of a processed, high-gloss photographic image to form a final coating having a thickness of 10–12 $\mu$. After complete drying, either by heat or storage, the coating can no longer be detached, even with mechanical stressing at both sides.

For comparison purposes, 13 g. of polyvinyl acetate are dissolved in the aforementioned solvent mixture and then applied and dried as described above. The coating can even be removed with the finger nail from the gelatine layer.

A processed, normal commercial multi-layer colour reversal film is treated by dipping with a solution of the copolymer as described above and dried. A solid, clear coating is obtained, which does not affect the colour balance and the curl of the film. After being kept for 7 days at 40° C. and a relative air humidity of 80–90%, the colour intensity and the colour equilibrium of the multi-layer material were not impaired. For comparison purposes, a processed, unlacquered film strip of the same material was employed which under the same conditions showed a considerable destruction of the dyestuffs, which results in color imbalance and a decrease of the colour intensity of the colour photographic image.

*Example 2*

The following compounds are dissolved in a solvent mixture consisting of 80 ml. of amyl acetate and 116 ml. of methyl acetate:

14 g. of a copolymer consisting of 85% of vinyl chloride,
12% of vinyl acetate,
3% of maleic anhydride, and
1.1 ml. of dibutyl phthalate.

After being applied with a wide marten bristle brush and dried, as in Example 1, the coating does not flake off on mechanical treatment. Similarly, a coating can be produced on both sides of a normal commercial colour film with the above solution by dipping.

*Example 3*

The following compounds are dissolved in a solvent mixture of 80 ml. of amyl acetate and 116 ml. of methyl acetate:

15 g. of a copolymer of vinyl chloride, vinyl acetate and maleic acid, such as for example, Hostalit CAM (R)—trade name of Farbwerke Hochst A.G.—and
1.1 ml. of di-(2-ethylhexyl) phthalate.

After being applied with a spray gun and dried as in Example 1, the coating does not flake off under mechanical stressing. The coating is insensitive to humidity and offers good protection against finger prints.

*Example 4*

The following compounds are dissolved in a solvent mixture consisting of 80 ml. of amyl acetate and 116 ml. of methyl acetate:

13 g. of a copolymer of vinyl chloride, vinyl acetate and maleic acid, such as for example Hostalith (CAM-(R)—trade name of Farbwerke Hochst A.G.
1.1 ml. of phthalic acid dibutyl ester, and
3.5 g. of 2',4'-dihydroxy-3',5'-ditert.-butyl benzophenone. After being applied and dried as in Example 1, the coating cannot be detached by mechanical stressing.

Colour photographic images provided with this coating are protected against fading by the action of light. Images which were irradiated with $7 \times 10^6$ Lux-hours remain unchanged.

*Example 5*

The following compounds are dissolved in a solvent mixture consisting of 80 ml. of amyl acetate and 116 ml. of methyl acetate:

13 g. of a copolymer consisting of 92% vinyl chloride, 3% of vinyl acetate and 5% of vinyl alcohol, viscosity factor $Z_n$ 0.57 in cyclohexanone at 20° C.
1.1 ml. of phthalic acid dibutyl ester, and
3.5 g. of 2,4'-dihydroxy-3',5'-ditert-butyl benzophenone.

After being applied and dried as in Example 1, a good adhesion of the protective coating on the gelatine layer is obtained. The coating provides good protection against finger prints, ultra-violet rays and mechanical action.

For comparison purposes,
13 g. of a binary copolymer of 87% vinyl chloride and 13% of vinyl acetate,
1.1 ml. of phthalic acid dibutyl ester and
3.5 g. of 2,4'-dihydroxy-3',5'-ditert.-butyl benzophenone are dissolved in the aforesaid solvent mixture.

After being applied with a spray gun and dried, as indicated in Example 1, a coating is obtained which can be detached from the gelatine layer by mechanical action and which cannot be used for photographic purposes.

*Example 6*

The following compounds are dissolved in a solvent mixture consisting of 80 ml. of amyl acetate and 116 ml. of acetone:

13 g. of a copolymer consisting of 86% of vinyl chloride, 13% of vinyl acetate and 1% of maleic acid, and
1.1 ml. of phthalic acid dibutyl ester.

A lacquer solution is obtained which shows a good compatibility with halogenated hydrocarbons, such as Freons, which are used as propellants in sprays.

*Example 7*

2 g. of a highly dispersed silica, for example Aerosil (trademark of Degussa), are dispersed as finely as possible in 50 ml. of amyl acetate and a solution of 13 g. of a copolymer consisting of 86% of vinyl chloride, 13% of vinyl acetate and 1% of maleic acid in a mixture of 30 ml. of amyl acetate and 116 ml. of acetone, with addition of 1.1 ml. of phthalic acid dibutyl ester is added thereto. If this mixture is applied to a processed colour paper picture using a spray gun, a matt surface is obtained after drying which surface can similarly not be detached by mechanical action. The protective coating is insensitive to finger prints and humidity.

*Example 8*

The following compounds are dissolved in a solvent mixture comprising 80 ml. amyl acetate and 116 ml. of methyl acetate:

14 g. of a copolymer consisting of 86% of vinyl chloride, 13% of vinyl acetate, and 1% of maleic anhydride, and
1.1 ml. of phthalic acid dibutyl ester.

This solution is applied onto a photographic high-gloss image by means of a spray gun. The spray pressure was 0.8–1.0 atmosphere (gauge) and the diameter of the nozzle was 1.2 mm. After drying a uniformly high-glossy, excellently adhering protective layer was obtained.

*Example 9*

A solution comprising: 325 g. gelatine, 4500 cc. water, and 2000 cc. of a 0.5% aqueous solution of Supragelb (Colour Index 22,905) was cast onto a glass disk. After drying, the gelatine foil having a thickness of approximately 50μ which is to be used as a yellow filter for the colour negative/positive process, is separated from the glass support and coated by dipping on both sides with the coplymer described in Example 1.

The resulting foil shows an excellent dimension stability and is not sensitive to water.

Having thus described our invention, we now believe our invention to be capable of numerous valuable modifications. The protective layers according to the invention may contain UV-absorbing compounds in an amount up to 50% by weight based on the dried layer, preferably 10–30%. Suitable UV-absorbing agents are, for example, benzal acetophenone and derivatives thereof as described in U.S. Patent 2,241,239, hydrazine derivatives as described in U.S. Patent 2,748,021, the compounds described in U.S. Patent 2,440,070, phenyl butadiene derivatives disclosed in Belgian Patent 588,539, the compounds described in U.S. Patent 2,719,086, or benzophenone derivatives as described in Belgian Patent 610,351.

The protective layers according to the invention may further contain matting agents, preferably finely divided silica. Other suitable matting agents are finely divided titanium dioxide, zirconium dioxide or aluminium phosphate.

We claim:

1. A processed photographic material containing a photographic image in a gelatine layer supported on a substrate, and a protective layer externally coated on the said gelatine layer, and having as essentially the sole film-forming binding agent a ternary copolymer of (I) vinyl chloride units in an amount of between 80–92%;
(II) vinyl acetate units in an amount of between 3–19.5% and
(III) units selected from the class consisting of maleic acid, maleic anhydride and vinyl alcohol in an amount of 0.5–5%.

2. A processed photographic material according to claim 1 in which the protective layer contains up to 10% of a plasticizing ester of phthalic acid.

3. A processed photographic material according to claim 1 in which the protective layer contains up to 50% based on the binder of an ultra-violet light absorbing agent.

4. A processed photographic material according to claim 1 in which the protective layer contains up to 35% of finely divided silica.

References Cited

UNITED STATES PATENTS

| | | | |
|---|---|---|---|
| 1,548,951 | 8/1925 | Malone | 117—81 |
| 2,241,239 | 5/1941 | Carroll et al. | 96—84 |
| 2,719,086 | 9/1955 | Sawdey et al. | 96—84 |
| 2,946,702 | 7/1960 | Bach | 117—161 |
| 2,981,637 | 4/1961 | Spencer et al. | 117—161 |
| 3,189,615 | 6/1965 | Heller et al. | 117—33.3 |

WILLIAM D. MARTIN, *Primary Examiner.*

S. W. ROTHSTEIN, P. F. ATTAGUILE,
*Assistant Examiners.*